(12) United States Patent
Herrick et al.

(10) Patent No.: US 10,430,461 B2
(45) Date of Patent: Oct. 1, 2019

(54) HDR METADATA SYNCHRONIZATION

(71) Applicant: Avago Technologies International Sales Pte. Limited, Singapore (SG)

(72) Inventors: Jason Herrick, Santa Clara, CA (US); Richard Wyman, Santa Clara, CA (US); Hongtao Zhu, Santa Clara, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/798,254

(22) Filed: Oct. 30, 2017

(65) Prior Publication Data
US 2019/0130035 A1 May 2, 2019

(51) Int. Cl.
*G06F 16/738* (2019.01)
*H04N 21/235* (2011.01)
*H04N 5/235* (2006.01)
*G06T 5/00* (2006.01)

(52) U.S. Cl.
CPC ............ *G06F 16/739* (2019.01); *G06T 5/009* (2013.01); *H04N 5/2355* (2013.01); *H04N 21/2353* (2013.01)

(58) Field of Classification Search
CPC .......................... G06F 17/30843; G06T 5/009
See application file for complete search history.

(56) References Cited

U.S. PATENT DOCUMENTS

| 9,769,417 B1* | 9/2017 | Yarygin | H04N 7/0884 |
| 2017/0374313 A1* | 12/2017 | Oh | H04N 7/015 |
| 2018/0007363 A1* | 1/2018 | Oh | H04N 19/10 |

* cited by examiner

*Primary Examiner* — Girumsew Wendmagegn
(74) *Attorney, Agent, or Firm* — Foley & Lardner LLP; Daniel Rose

(57) ABSTRACT

In some aspects, the disclosure is directed to methods and systems for synchronization management of high dynamic range (HDR) media metadata. A synchronization controller of a media device may receive a first set of HDR media metadata provided in connection with one or more images of media. The synchronization controller may disable a metadata synchronization indicator provided to each core of a plurality of processing cores of the media device, responsive to receiving the first set of HDR media metadata. The synchronization controller may write the first set of HDR media metadata to a first memory location while the metadata synchronization indicator is disabled. The synchronization controller may enable the metadata synchronization indicator, responsive to completion of writing of the first set of HDR media metadata to the first memory location.

20 Claims, 7 Drawing Sheets

HDR METADATA SYNCHRONIZATION

FIELD OF THE DISCLOSURE

This disclosure generally relates to systems and methods for synchronization of high dynamic range (HDR) media metadata across media processors.

BACKGROUND OF THE DISCLOSURE

High dynamic range (HDR) media may include static metadata, such as that described in the Society of Motion Picture and Television Engineers (SMPTE) standard 2086, "Mastering Display Color Volume Metadata Supporting High Luminance and Wide Color Gamut Images," (SMPTE ST-2086), and/or dynamic metadata, such as that described in SMPTE standard 2094, "Dynamic Metadata for Color Volume Transform—Core Components," (SMPTE ST-2094-1). The metadata may be associated with one or more media images (e.g. frames of video, images, rendered media, etc.) and may comprise instructions or configuration information for reproducing color and luminance data of the media images.

In many implementations, HDR metadata may be very large, including thousands of data elements. Due to this size, it may not be possible to process this data with the same mechanisms used to process other data associated with a video buffer, as reading and writing the metadata to and from memory may consume significant time or bandwidth. However, in many implementations, failure to synchronize HDR metadata and associated video buffers may result in image corruption (e.g. if the metadata is mistakenly associated with a different picture buffer).

Furthermore, in many implementations, a device may include multiple media processors or cores (sometimes referred to as graphics processors, video decoders, video processors, or by other such names) that process media images in parallel (for example, each core may process a different portion of a frame of video, such as a first core processing a top third, a second core processing a second third, and a third core processing a bottom third) and/or in serial (for example, a first core may process a first frame while a second core processes a second frame). Thus, not only must metadata be properly synchronized with a video buffer, the metadata must be provided in synchronization to each core.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following the Society of Motion Picture and Television Engineers (SMPTE) standard(s), including any draft versions of such standard(s), are hereby incorporated herein by reference in their entirety and are made part of the present disclosure for all purposes: SMPTE ST-2086; and SMPTE ST-2094-1 et seq. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for HDR Metadata Synchronization and Section B describes a network environment and computing environment which may be useful for practicing embodiments described herein.

A. High Dynamic Range (HDR) Metadata Synchronization

High dynamic range (HDR) media may include static metadata, such as that described in the Society of Motion Picture and Television Engineers (SMPTE) standard 2086, "Mastering Display Color Volume Metadata Supporting High Luminance and Wide Color Gamut Images," (SMPTE ST-2086), and/or dynamic metadata, such as that described in SMPTE standard 2094, "Dynamic Metadata for Color Volume Transform—Core Components," (SMPTE ST-2094-1). The metadata may be associated with one or more media images (e.g. frames of video, images, rendered media, etc.) and may comprise instructions or configuration information for reproducing color and luminance data of the media images.

Figure 1A:
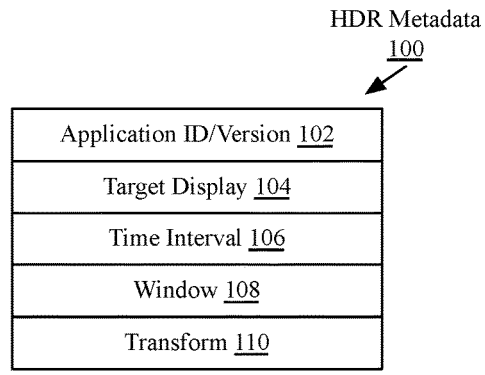
FIG. 1A is an illustration of an example of high dynamic range (HDR) metadata, according to one implementation.

For example, as shown in FIG. 1A, HDR metadata 100 may comprise, in various implementations, application identifiers and/or version identifiers 102; target display types 104; time intervals (e.g. frames of video) to which the transform applies 106; spatial windows (e.g. portions of frames, such as rectangles bounded by pairs of x,y coordinates) to which the transform applies 108; and one or more transform coefficients 110. In some implementations, metadata 100 may include xy chromaticity coordinates of the mastering display, xy chromaticity coordinates of a white point of the mastering display, a maximum mastering display luminance, and a minimum mastering display luminance. Accordingly, the metadata 100 may also define a luminance and color space intended for reproduction of the video frames.

Figure 1B:
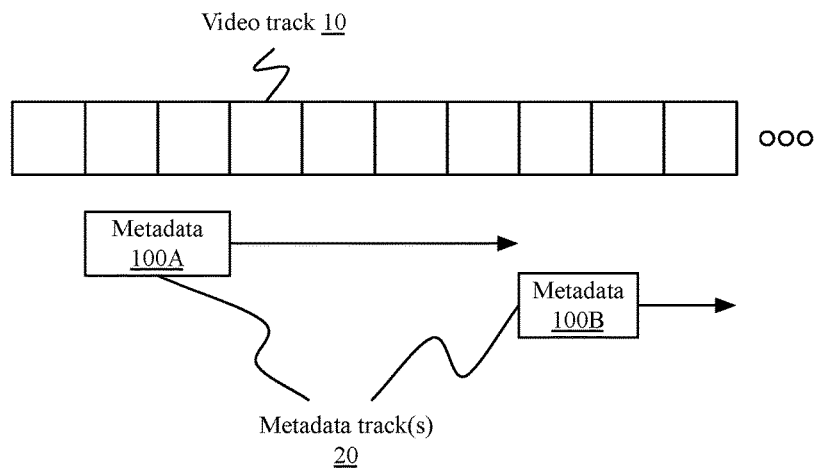
FIG. 1B is an illustration of HDR metadata tracks accompanying a video track, according to one implementation.

As the color and luminance characteristics change throughout a video from frame to frame or scene to scene, different color volume transforms 110 may need to be used. For example, bright scenes may utilize one transform, while dark scenes may utilize a different transform. Referring briefly to FIG. 1B, as shown, a video track 10 may comprise a plurality of frames of video in sequence. The frames of video may be associated with metadata 100A-100B provided in a metadata track 20, which may have a time interval 106 corresponding to a number of frames for which the metadata 100A, 100B is valid. In some implementations, multiple metadata tracks 20 may be provided, for different transformations or reproductions on different target displays 104 (e.g. SDR displays, UHD displays, etc.). The transform or transforms 110 may be provided as a piecewise linear function (PWL), a lookup table (LUT) mapping from one or more luminance or color component ranges of the mastering display to luminance or color component ranges of the target display, or any other such transformation. The transformation may represent a mapping of color and luminance values for an input pixel to an output pixel for a target display. For example, in one implementation in which the target display is the mastering display, the transformation may be an identity transformation (e.g. input[R,G,B]=output[R,G,B]). In other implementations, such as where a mastering display has a different dynamic range than a target display, the transformation for a given pixel may include multiplicative and additive coefficients corresponding to differences in dynamic range and peak or minimum luminance.

In many implementations, HDR metadata may be very large, including thousands of data elements. Transformation coefficients may be very data-intensive, for example, for a LUT that includes many points or ranges of mappings. Due to this size, it may not be possible to process this data with the same mechanisms used to process other data associated with a video buffer, as reading and writing these metadata values from the metadata track or tracks to a buffer or register for use by a media processor or video decoder may require significant time or bus bandwidth. For example, metadata must be completely received to be used, as the transform coefficients 110 may represent different color and luminance ranges within the image. Receipt of only part of the metadata, for example, may indicate how to properly decode dark colored pixels, but not light colored pixels, resulting in image corruption.

These delays may result in metadata not being available for use when decoding a corresponding image or video frame. In many implementations, failure to synchronize the metadata and the corresponding image or video frame may result in image corruption. For example, if the metadata for a first image or scene is configured for a very dark scene, and the next scene is very bright, use of the metadata from the dark scene for decoding the subsequent frame from the bright scene may result in an overly bright or luminance-clipped image. Synchronization failures may also be the result of dropped or repeated video buffers, such as where there is a rate difference between incoming image data to the device and image data being consumed by the display. For example, rather than pausing or stalling output when input image data is missing or delayed, it may be desirable to repeat a previous frame of data in a video buffer so that the resulting output video has a constant frame rate. If the metadata is not similarly repeated, the metadata track and video track may become desynchronized, resulting in image corruption.

Furthermore, in many implementations, a device may include multiple media processors or cores (sometimes referred to as graphics processors, video decoders, video processors, or by other such names) that process media images in parallel (for example, each core may process a different portion or window 108 of a frame of video, such as a first core processing a top third, a second core processing a second third, and a third core processing a bottom third) and/or in serial (for example, a first core may process a first frame while a second core processes a second frame). Thus, not only must metadata be properly synchronized with a video buffer, the metadata must be provided in synchronization to each core to prevent color and luminance nonlinearities and corruption across the frame or across consecutive frames.

The systems and methods discussed herein provide three different mechanisms that may be used, alone or in any combination, to configure the various cores with metadata for proper decoding, while maintaining synchronization. If all settings and configurations for delivering metadata and processing images are ready, then they may be applied to the cores simultaneously. If all settings are not ready, they may all be skipped and not partially used.

A first method provided by these systems and methods for loading settings is through Register direct memory access (DMA): a portion of memory accessible to each core is allocated to contain a Register Update List (RUL). The RUL may contain register settings, such as setting a first register A to a first value X, a second register B to a second value Y, etc. The list may be generated or configured and then, to make the list "pending" or active so that it may be executed by hardware, the RUL address may be given to the core or cores for DMA access.

A second method provided by these systems and methods is similar to the Register DMA technique discussed above, but utilizes a lookup table (LUT): register settings are put into memory, but the cores do not read a RUL to identify the settings or receive a configuration from an RDC core which reads the RUL, determines the register commands, and executes the register commands. Instead, the individual cores are directed to read the LUT directly. To activate the LUT or make it "pending", the cores may be given the address of the LUT table in memory.

The above techniques are useable in implementations in which each core has access to a shared memory space or direct memory access. If one or more cores does not have access to the shared memory space or direct memory access or in implementations in which access is disabled and cannot use the LUT, then in a third technique, metadata may be written to core-specific memory or registers. The metadata may be double-buffered or written to a first register while a second register is being utilized, and vice versa, ensuring that the core does not attempt to use partially written metadata.

The first and second techniques discussed above may be kept synchronous between the various cores by having the RUL contain the address write that activates the LUT table. That is, a first RUL A may contain LUT A settings; and a second RUL B may contain LUT B settings. LUT A may be in use while newly received metadata is being provided to LUT B and vice versa. If, due to frame dropping or other such instance, RUL A is skipped, then the corresponding LUT A will be skipped (as the cores will lack the address for LUT A). Similarly, if RUL A is repeated (e.g. due to stalls or delays in incoming data), LUT A will be repeated. Of course, RUL A cannot be activated until LUT A is ready.

To ensure activation of the register update list when ready, the media processor may include a synchronization controller, discussed in more detail below. The synchronization controller may provide a synchronizing trigger to a plurality of cores (e.g. BVN network processors, HDMI transmitters, etc.) simultaneously to indicate settings are available.

To maintain synchronization when using the third technique, an activation trigger used to indicate when new settings are required may be disabled during copying or writing of the metadata to registers (e.g. during writing of core-specific registers), and reenabled once writing is complete. While the activation trigger is disabled, the cores may use previously provided metadata settings. When the activation trigger is enabled, after updating RUL addresses and core-specific registers, each core may immediately begin using the newly provided metadata settings. Enablement of the activation trigger thus becomes a point for which all settings for the cores become pending all at the same time. On a subsequent synchronization trigger, the settings may be enabled: for the first and second technique, this is done with hardware loading the RUL; and for the third technique, this is done with the synchronizer trigger which activates the double-buffered settings for each core at the same time.

Figure 2:
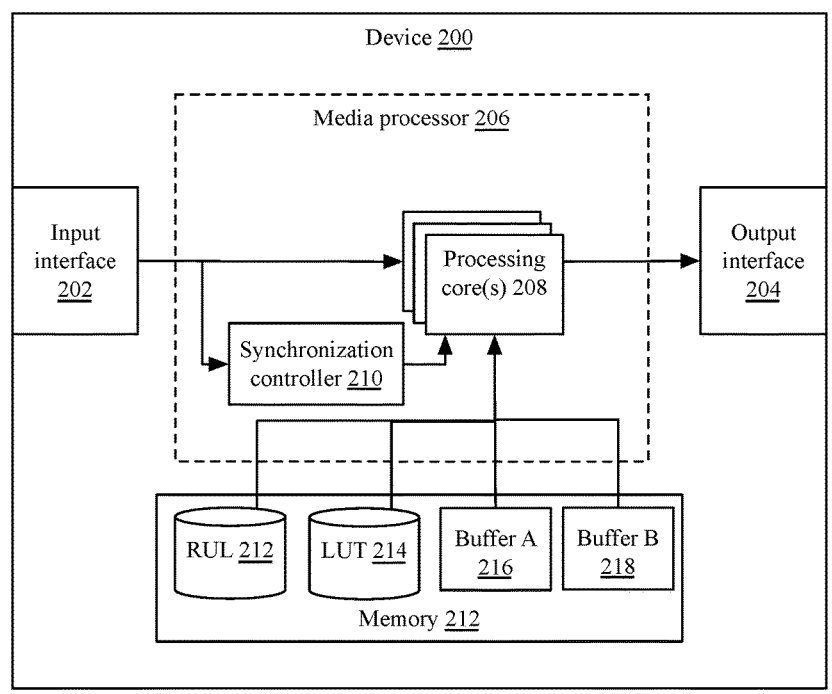
FIG. 2 is a block diagram of a system for managing HDR metadata synchronization for a plurality of processing cores, according to one implementation.

FIG. 2 is a block diagram of a system for managing HDR metadata synchronization for a plurality of processing cores, according to one implementation. Device 200 may comprise a video processor, a set top box, a video router or distribution amplifier, a splitter, an X-Y interface, a switcher, a compositor, or any other type and form of appliance or computing device. Device 200 may comprise a desktop computer, laptop computer, tablet computer, wearable computer, smart phone, smart television, or any other type and form of device. Device 200 may include additional components including one or more processors, one or more memory units 212, one or more network interfaces, one or more input/output devices such as displays or keyboards, or any other type and form of device. The processors may include a microprocessor, an application-specific integrated circuit (ASIC), a field-programmable gate array (FPGA), etc., or combinations thereof. The memory units 212 may include, but are not limited to, electronic, optical, magnetic, or any other storage or transmission device capable of providing processor with program instructions. The memory units may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The memory units may include one or more applications, services, routines, servers, daemons, or other executable logics for executing applications and for requesting and displaying media files. These applications, services, routines, servers, daemons, or other executable logics may be integrated such that they may communicate with one another or be enabled to make calls to routines of each other.

Device 200 may comprise an input interface 202 and/or output interface 204 for receiving and providing SDR and/or HDR media, including images, videos, and renderings. In some implementations, an input interface 202 and/or output interface 204 may comprise an HDMI interface, component video interface, DVI interface, DisplayPort interface, or other such video interface. In some implementations, an input interface 202 and/or output interface 204 may comprise a data interface, such as a network interface, Ethernet port, 802.11 (WiFi) interface, BlueTooth interface, cellular interface, satellite interface, or any other type and form of data interface. Thus, device 200 may receive a first item of media in a first format via any type of input, may process and convert the first item of media to a second format, and may provide the first item of media in the second format via any type of output. In some implementations, device 200 may generate media internally, such as when generating a rendered image or video, and thus, input interface 202 may comprise an interface to another application executed by device 200 (e.g. a rendering application, video game, media player, or any other such application).

Device 200 may comprise a media processor 206, which may be implemented in hardware circuitry, software executed by a processor or processors of device 200, or a combination of hardware and software. For example, in one implementation, media processor 206 may comprise an ASIC circuit for converting a media bitstream from a first format to a second format.

Media processor 206 may comprise a plurality of processing cores 208, which may be sometimes referred to as media processors, media decoders, HDMI transmitters, video buffers, or by other such terms. Processing cores 208 may perform various type of processing and/or decoding functions, including entropy decoding, luminance and/or color mapping or transforming, digital to analog conversion, encryption or decryption, or any other such functions. Processing cores 208 may operate on a media bit stream in parallel (e.g. on various portions of an image, such as horizontal or vertical blocks, rows, columns, macroblocks, or other divisions) and/or in serial (e.g. on subsequent frames or fields). Processing cores 208 may be associated with buffers for holding and accumulating incoming data from a bit stream for decoding or processing. Processing cores 208 may comprise memory registers for storing metadata and/or other configuration information such as transformation coefficients. In some implementations, these memory registers may be internal to processing cores 208, or may be external, e.g. in memory 212.

To maintain synchronization between video frames and metadata, and across cores 208, media processor may comprise a synchronization controller 210. Synchronization controller 210 may comprise hardware, such as an ASIC circuit or FPGA; may comprise software, such as a service, server, daemon, routine, or other executable logic; or may comprise a combination of hardware and software, such as an EEPROM programmed with firmware. Synchronization controller 210 may control synchronization of cores 208 via transmitted synchronization triggers, which may comprise pulses, bitstreams, strings, flags, commands, or other predetermined data or signals. Synchronization triggers and/or other control commands may direct processing cores 208 to switch buffers from a first buffer A 216 to a second buffer B 218 or vice versa; to read a new RUL address within memory 212; or to read a new address of a LUT 214 from a RUL 212 and access the LUT. Synchronization triggers may be provided on a dedicated signal bus, via a serial bus or intercore bus, or via a flag or predetermined string placed in memory 212 accessible by processing cores 208. In some implementations, a synchronization trigger may comprise an address of a LUT 214 or RUL 212.

Although shown separate from processing cores 208 and media processor 206, in many implementations, memory 212 may be part of each core 208 or processor 206, or one or more of RUL 212, LUT 214, and buffers 216, 218 may be in separate memory within a processing core 208 and/or media processor 206 (e.g. cache memory, or other such memory). As discussed above, register update list or RUL 212 may comprise one or more register settings, including an address of a LUT 214 within shared memory or core-accessible memory 212 comprising received metadata. Similarly, buffers 216, 218 may comprise double-buffered storage for writing and reading received metadata. These buffers may be part of processing blocks in many implementations. For example, a processing core may be directed to process a first buffer (e.g. buffer A). The processing core may be configured via a RUL (as in the first method discussed above), via a LUT whose address is contained in a RUL (as in the second method), or may be programmed directly with double buffered registers which become active once a synchronizing trigger is sent to the processing core.

Figure 3A:
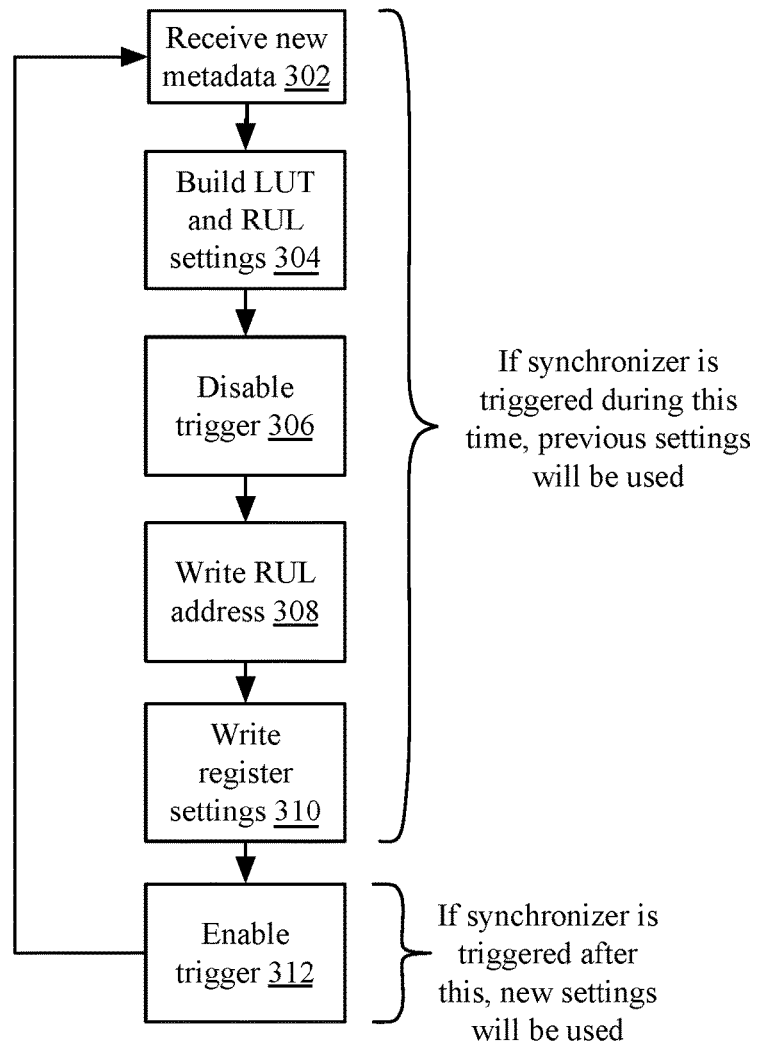
FIG. 3A is a flow chart of an implementation of a method for HDR metadata synchronization by a synchronization controller.

FIG. 3A is a flow chart of an implementation of a method for HDR metadata synchronization by a synchronization controller 210. New metadata may be received at step 302, in some implementations. The metadata may be provided with a video track as part of an incoming bit stream, and may be extracted from the bit stream by the synchronization controller (or a core 208 configured for receiving metadata and writing metadata to one or more places in memory). At step 304, the core 208 or synchronization controller 210 may build the LUT and RUL settings for the newly received metadata.

At step 306, responsive to receipt of the new metadata, the core or synchronization controller may disable transmission of synchronization triggers to the cores. In some implementations, triggers may be sent by a hardware circuit or element, e.g. in response to a timer expiration. For example, an activation trigger may be sent at periodic intervals corresponding to video frames or timing intervals. The activation trigger may be sent only when enabled, in many implementations. Thus, disabling of the activation trigger prior to a subsequent transmission may prevent the activation trigger from being received by the cores. In other implementations, the activation trigger may be sent at every periodic interval, to direct the core to process a subsequent video buffer, window, or frame. The activation trigger may comprise an identifier or indicator of whether the synchronization trigger is disabled (e.g. at step 306) or enabled (at step 312, discussed below); or respectively, whether the core should use old RUL or LUT settings or metadata, or new RUL or LUT settings or metadata. Although shown after step 304, in some implementations, step 306 may occur prior to step 304.

At step 308, the synchronization controller may write the new RUL address to cache memory, buffers, or registers of each core. In some implementations, the cache, buffers, or registers may be configured to be double buffered, such that writing the new RUL address does not overwrite the previously written RUL address (but possibly overwriting a RUL address prior to the immediately previous RUL address). This may allow the core to still read the RUL address At step 310, the synchronization controller 210 may write register settings to memory of the cores 208, such as cache memory, buffers, or registers, again double-buffered as discussed above. In some implementations, the synchronization controller 210 may write the register settings to a currently disabled or inactive buffer or register of each core. The settings may be written to each buffer or register for each core in serial, or simultaneously in parallel.

At step 312, responsive to completing writing the register settings, the synchronization controller 210 may enable the trigger or transmission to the cores 208, as discussed above. Accordingly, the interval between steps 306 and 312 may represent a "pause" for writing new metadata during which the cores may continue to read metadata from a previously used memory location or address; and after step 312, the cores may begin reading metadata from a new memory location or address.

Figure 3B:
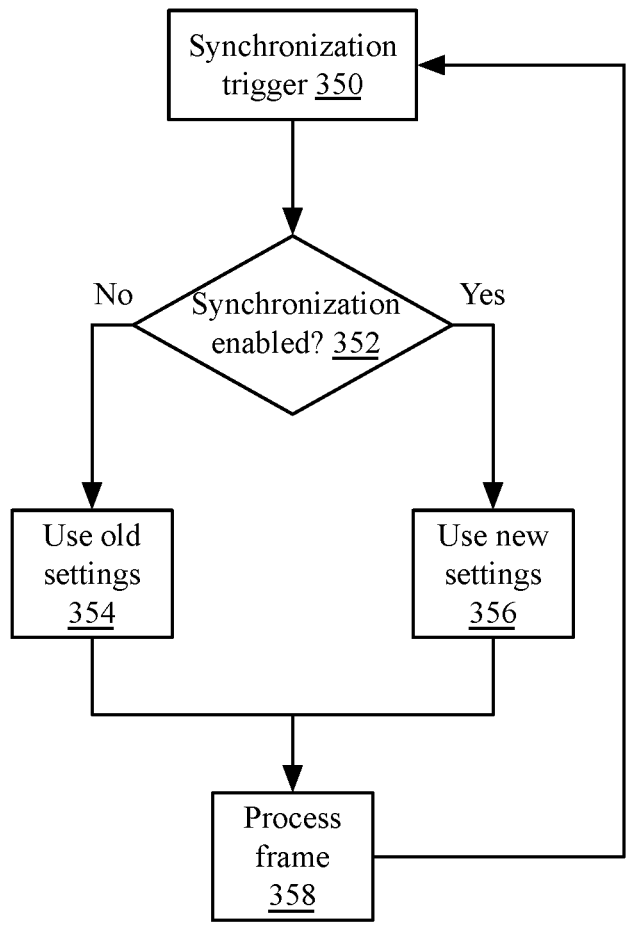
FIG. 3B is a flow chart of an implementation of a method for HDR metadata synchronization by a processor core.

FIG. 3B is a flow chart of an implementation of a method for HDR metadata synchronization, by a processor core. As discussed above, implementations of the method of FIG. 3A may be considered to be performed from the perspective of the synchronization controller; implementations of the method of FIG. 3B may accordingly be considered to be performed from the perspective of a core. The methods may thus be performed by these entities simultaneously, with enablement and disablement of synchronization triggers performed at any point during the steps of FIG. 3B. Implementations of the method of FIG. 3B may be performed by one or more processor cores, as discussed above.

At step 350, the core may receive a synchronization trigger. The synchronization trigger may comprise a predetermined signal, flag, bit, string, or other trigger. In some implementations, the synchronization trigger may indicate whether it is enabled or disabled (e.g. via a predetermined value). In other implementations, at step 352, the core may determine whether synchronization is enabled or disabled based on the presence of a predetermined bit at a predetermined memory location, flag, signal value, or other such indicator. As discussed above, the synchronization trigger may indicate that metadata should be used for processing a frame or portion of a frame. In some implementations, triggers may be sent for each new frame, and may thus indicate synchronization of frame processing across cores at step 358; in such implementations, as discussed above, the trigger may be disabled to indicate that old metadata settings should be used at step 354, or enabled to indicate that new metadata settings are available at step 356. The metadata settings may be retrieved from a LUT at an address identified in a RUL, or may be retrieved from a buffer or cache. At step 354, the metadata settings may be retrieved from a previously provided location or enabled buffer; at step 356, in response to an enabled synchronization trigger, the metadata settings may be retrieved from a new location (e.g. a new LUT address identified in an updated RUL, or a second buffer utilized or made active so that the first buffer may be overwritten). At step 358, the core may perform processing functions using the metadata, such as decoding, decryption, color or luminance transformations, transmission to downstream devices, or other such functions.

In some implementations, at step 358, if the metadata has not been updated (i.e. the trigger is disabled, indicating that old metadata settings should be used), then the previous image frame may be re-rendered using the old metadata (e.g. rather than processing a new frame with the old metadata). This may cause the frame to be repeated; however, the metadata will be similarly repeated (or rather, re-used), such that the frame and metadata are accurately synchronized. Once the newly received metadata has finished being processed and written and the trigger re-enabled, the subsequent frame (and corresponding metadata) may be processed.

Thus, in such implementations, the metadata is always aligned with the video frame when provided for rendering or display, regardless of the delay needed to process and/or write the metadata (which may take significant time to compute and time to load into the various computation blocks or place into DRAM). To prevent a frame from being rendered or displayed with the wrong metadata or configuration (or a new video frame and old metadata), unless all computation of configuration is complete and ready to be used by the time the next trigger comes to start the next frame output, the system may instead repeat a frame (and its corresponding metadata) than to allow the frame and metadata/configuration to misalign. Accordingly, this process guarantees that all three paths of configuration are kept consistent and those are consistent with a particular frame/metadata decoded from the bitstream.

Accordingly, the systems and methods discussed herein provide for synchronization of HDR metadata across a plurality of cores without forced dropping of frames or image corruption due to delays writing large metadata parameters to memory. Although primarily discussed in terms of synchronization of HDR media and HDR metadata, the same techniques and systems may be applicable to synchronizing other types of metadata and associated media, while avoiding the issues of dropping of frames or image corruption.

In one aspect, the present disclosure is directed to a method for synchronization management of high dynamic range (HDR) media metadata. The method includes receiving, by a synchronization controller of a media device, a first set of HDR media metadata provided in connection with one or more images of media. The method also includes disabling, by the synchronization controller, a metadata synchronization indicator provided to each core of a plurality of processing cores of the media device, responsive to receiving the first set of HDR media metadata. The method also includes writing, by the synchronization controller while the metadata synchronization indicator is disabled, the first set of HDR media metadata to a first memory location. The method also includes enabling, by the synchronization controller, the metadata synchronization indicator, responsive to completion of writing of the first set of HDR media metadata to the first memory location.

In some implementations, the method includes transmitting, by the synchronization controller, a synchronization trigger to each core of the plurality of processor cores. In a further implementation, transmitting the synchronization trigger is performed while the metadata synchronization indicator is disabled; and receipt of the synchronization trigger causes each core of the plurality of processor cores to utilize a previous set of HDR media metadata stored in a second memory location. In another further implementation, transmitting the synchronization trigger is performed while the metadata synchronization indicator is enabled; and receipt of the synchronization trigger causes each core of the plurality of processor cores to utilize the first set of HDR media metadata stored in the first memory location.

In some implementations, the method includes writing the first set of HDR media metadata to the first memory location by writing, by the synchronization controller while the metadata synchronization indicator is disabled, the first set of HDR media metadata to a buffer of each core of the plurality of processor cores. In a further implementation, the method includes transmitting a synchronization trigger to each core of the plurality of processor cores, by the synchronization controller while the metadata synchronization indicator is disabled, receipt of the synchronization trigger causing each core of the plurality of processor cores to utilize a previous set of HDR media metadata stored in a second buffer of each core of the plurality of cores. In another further implementation, the method includes transmitting a synchronization trigger to each core of the plurality of processor cores, by the synchronization controller while the metadata synchronization indicator is enabled, receipt of the synchronization trigger causing each core of the plurality of processor cores to utilize the first set of HDR media metadata stored in the first buffer.

In some implementations, the method includes writing, by the synchronization controller while the metadata synchronization indicator is disabled, the first set of HDR media metadata to memory accessible to the plurality of processor cores at a first address; and enabling the metadata synchronization indicator further includes providing the first address to each core of the plurality of processor cores, responsive to completion of writing of the first set of HDR media metadata to the first memory location. In a further implementation, the method includes generating a lookup table comprising the first set of HDR media metadata.

In another aspect, the present disclosure is directed to a method for synchronization management of high dynamic range (HDR) media metadata. The method includes receiving, by a first core of a plurality of processing cores of a media device, a synchronization trigger. The method also includes determining, by the first core, that a metadata synchronization indicator is enabled. The method also includes processing a portion of HDR media according to HDR media metadata stored in a first memory location, by the first core, responsive to the determination that the metadata synchronization indicator is enabled. The method also includes subsequently receiving, by the first core, a second synchronization trigger. The method also includes determining, by the first core, that the metadata synchronization indicator is disabled. The method also includes processing a second portion of the HDR media according to the HDR media metadata stored in the first memory location, by the first core, responsive to the determination that the metadata synchronization indicator is disabled.

In some implementations, the method includes subsequently receiving, by the first core, a third synchronization trigger. The method also includes determining, by the first core, that the metadata synchronization indicator is enabled; and processing a third portion of the HDR media according to second HDR media metadata stored in a second memory location, by the first core, responsive to the determination that the metadata synchronization indicator is enabled. The second HDR media metadata may correspond to the third portion of the HDR media (e.g. with matching timestamps or similar identifiers).

In some implementations, the method includes receiving, by the first core from a synchronization controller of the media device, an address of the first memory location storing the HDR media metadata.

In another aspect, the present disclosure is directed to a system for synchronization management of high dynamic range (HDR) media metadata. The system includes a media device comprising a plurality of processing cores, a memory unit, and a synchronization controller. The synchronization controller is configured to receive a first set of HDR media metadata provided in connection with one or more images of media. The synchronization controller is also configured to disable a metadata synchronization indicator provided to each core of the plurality of processing cores, responsive to receiving the first set of HDR media metadata. The synchronization controller is also configured to write, while the metadata synchronization indicator is disabled, the first set of HDR media metadata to a first memory location of the memory unit. The synchronization controller is also configured to enable the metadata synchronization indicator, responsive to completion of writing of the first set of HDR media metadata to the first memory location.

In some implementations, the synchronization controller is further configured to transmit a synchronization trigger to each core of the plurality of processor cores. In a further implementation, transmitting the synchronization trigger is performed while the metadata synchronization indicator is disabled; and receipt of the synchronization trigger causes each core of the plurality of processor cores to utilize a previous set of HDR media metadata stored in a second memory location. In another further implementation, transmitting the synchronization trigger is performed while the metadata synchronization indicator is enabled; and receipt of the synchronization trigger causes each core of the plurality of processor cores to utilize the first set of HDR media metadata stored in the first memory location.

In some implementations, the synchronization controller is further configured to write, while the metadata synchronization indicator is disabled, the first set of HDR media metadata to a buffer of each core of the plurality of processor cores. In a further implementation, the synchronization controller is further configured to transmit a synchronization trigger to each core of the plurality of processor cores, while the metadata synchronization indicator is disabled, receipt of the synchronization trigger causing each core of the plurality of processor cores to utilize a previous set of HDR media metadata stored in a second buffer of each core of the plurality of cores. In another further implementation, the synchronization controller is further configured to transmit a synchronization trigger to each core of the plurality of processor cores, while the metadata synchronization indicator is enabled, receipt of the synchronization trigger causing each core of the plurality of processor cores to utilize the first set of HDR media metadata stored in the first buffer.

In some implementations, the synchronization controller is further configured to generate a lookup table comprising the first set of HDR media metadata; write, while the metadata synchronization indicator is disabled, the lookup table to memory accessible to the plurality of processor cores at a first address; and provide the first address to each core of the plurality of processor cores, responsive to completion of writing of the first set of HDR media metadata to the first memory location.

B. Computing and Network Environment

Figure 4A:
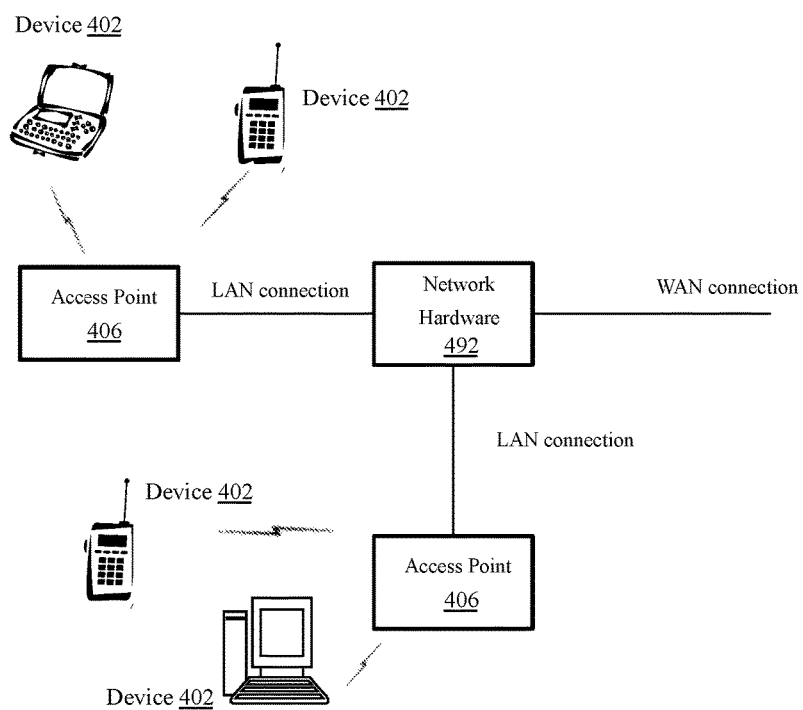
FIG. 4A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 4A, an embodiment of a network environment is depicted. In brief overview, the network environment includes a wireless communication system that includes one or more access points 406, one or more wireless communication devices 402 and a network hardware component 492. The wireless communication devices 402 may for example include laptop computers 402, tablets 402, personal computers 402 and/or cellular telephone devices 402. The details of an embodiment of each wireless communication device and/or access point are described in greater detail with reference to FIGS. 4B and 4C. The network environment can be an ad hoc network environment, an infrastructure wireless network environment, a subnet environment, etc. in one embodiment The access points (APs) 406 may be operably coupled to the network hardware 492 via local area network connections. The network hardware 492, which may include a router, gateway, switch, bridge, modem, system controller, appliance, etc., may provide a local area network connection for the communication system. Each of the access points 406 may have an associated antenna or an antenna array to communicate with the wireless communication devices 402 in its area. The wireless communication devices 402 may register with a particular access point 406 to receive services from the communication system (e.g., via a SU-MIMO or MU-MIMO configuration). For direct connections (e.g., point-to-point communications), some wireless communication devices 402 may communicate directly via an allocated channel and communications protocol. Some of the wireless communication devices 402 may be mobile or relatively static with respect to the access point 406.

In some embodiments an access point 406 includes a device or module (including a combination of hardware and software) that allows wireless communication devices 402 to connect to a wired network using Wi-Fi, or other standards. An access point 406 may sometimes be referred to as an wireless access point (WAP). An access point 406 may be configured, designed and/or built for operating in a wireless local area network (WLAN). An access point 406 may connect to a router (e.g., via a wired network) as a standalone device in some embodiments. In other embodiments, an access point can be a component of a router. An access point 406 can provide multiple devices 402 access to a network. An access point 406 may, for example, connect to a wired Ethernet connection and provide wireless connections using radio frequency links for other devices 402 to utilize that wired connection. An access point 406 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 406 may be used for (e.g., in-home or in-building) wireless networks (e.g., IEEE 802.11, Bluetooth, ZigBee, any other type of radio frequency based network protocol and/or variations thereof). Each of the wireless communication devices 402 may include a built-in radio and/or is coupled to a radio. Such wireless communication devices 402 and/or access points 406 may operate in accordance with the various aspects of the disclosure as presented herein to enhance performance, reduce costs and/or size, and/or enhance broadband applications. Each wireless communication devices 402 may have the capacity to function as a client node seeking access to resources (e.g., data, and connection to networked nodes such as servers) via one or more access points 406.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 4B:
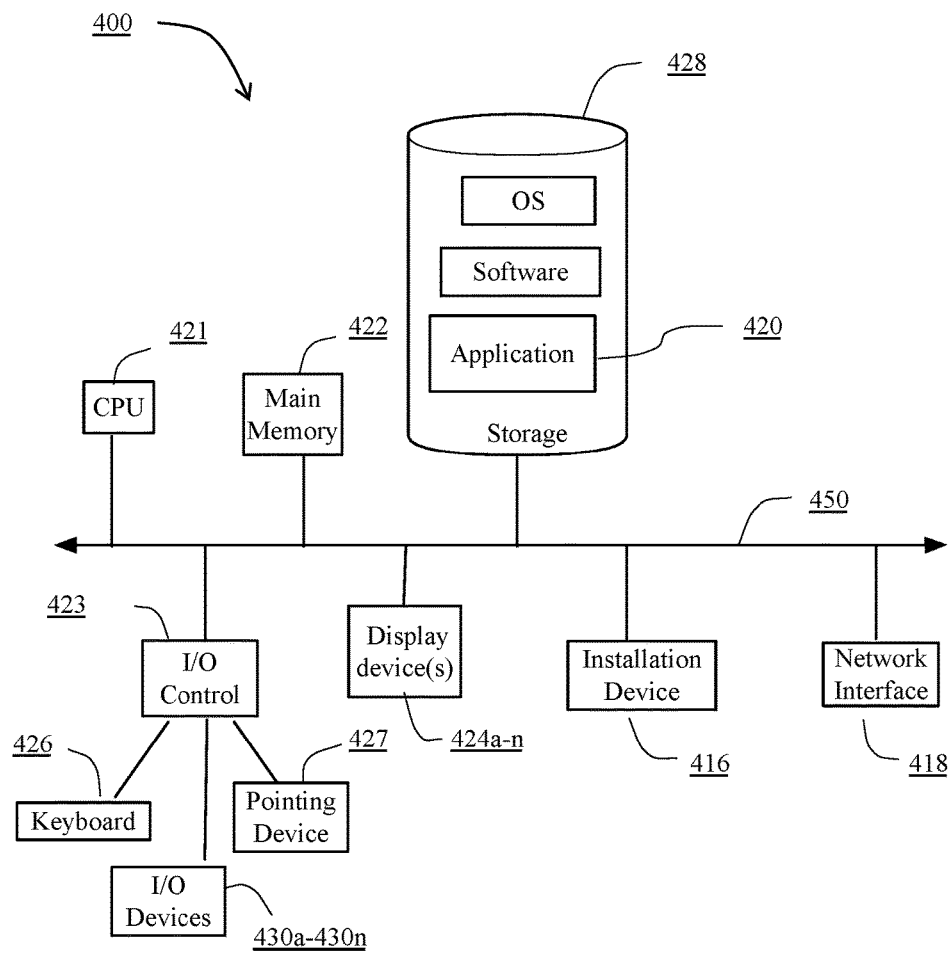
FIGS. 4B and 4C are block diagrams depicting embodiments of computing devices useful in connection with the methods and systems described herein.
Figure 4C:
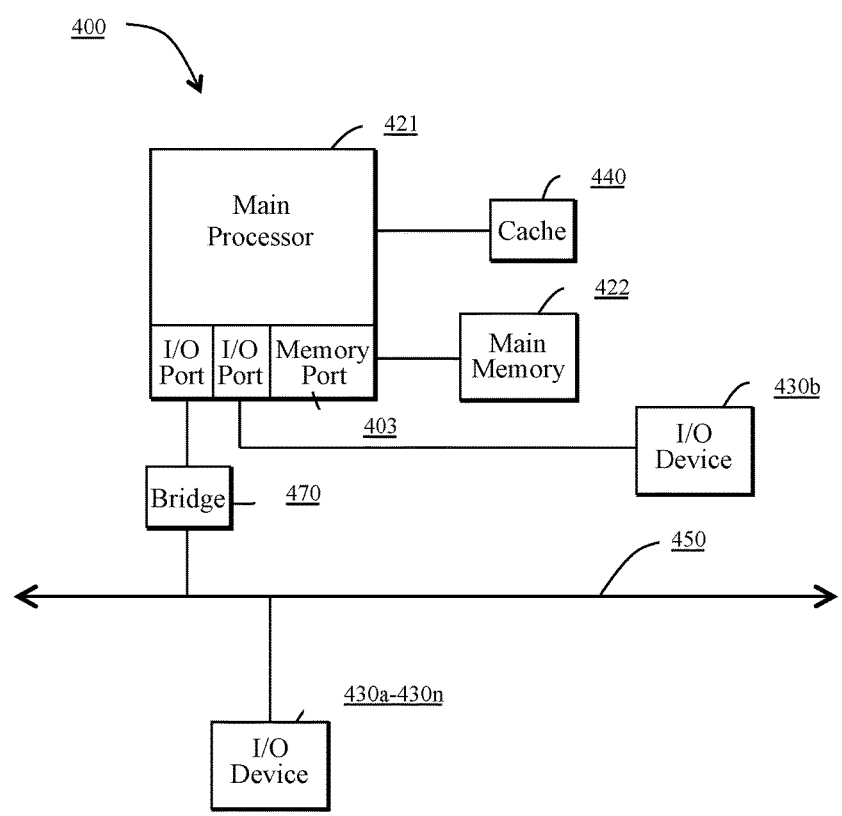

The communications device(s) 402 and access point(s) 406 may be deployed as and/or executed on any type and form of computing device, such as a computer, network device or appliance capable of communicating on any type and form of network and performing the operations described herein. FIGS. 4B and 4C depict block diagrams of a computing device 400 useful for practicing an embodiment of the wireless communication devices 402 or the access point 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-424n, a keyboard 426 and a pointing device 427, such as a mouse. The storage device 428 may include, without limitation, an operating system and/or software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4B, the processor 421 communicates with main memory 422 via a system bus 450 (described in more detail below). FIG. 4C depicts an embodiment of a computing device 400 in which the processor communicates directly with main memory 422 via a memory port 403. For example, in FIG. 4C the main memory 422 may be DRDRAM.

FIG. 4C depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4C, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 may communicate directly with I/O device 430*b*, for example via HYPERTRANSPORT, RAPIDIO, or INFINIBAND communications technology. FIG. 4C also depicts an embodiment in which local busses and direct communication are mixed: the processor 421 communicates with I/O device 430*a* using a local interconnect bus while communicating with I/O device 430*b* directly.

A wide variety of I/O devices 430*a*-430*n* may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4B. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4B, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424*a*-424*n*. As such, any of the I/O devices 430*a*-430*n* and/or the I/O controller 423 may include any type and/or form of suitable hardware, software, or combination of hardware and software to support, enable or provide for the connection and use of the display device(s) 424*a*-424*n* by the computing device 400. For example, the computing device 400 may include any type and/or form of video adapter, video card, driver, and/or library to interface, communicate, connect or otherwise use the display device(s) 424*a*-424*n*. In one embodiment, a video adapter may include multiple connectors to interface to the display device(s) 424*a*-424*n*. In other embodiments, the computing device 400 may include multiple video adapters, with each video adapter connected to the display device(s) 424*a*-424*n*. In some embodiments, any portion of the operating system of the computing device 400 may be configured for using multiple displays 424*a*-424*n*. One ordinarily skilled in the art will recognize and appreciate the various ways and embodiments that a computing device 400 may be configured to have one or more display devices 424*a*-424*n*.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4B and 4C may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for synchronization management of high dynamic range (HDR) media metadata, comprising:
   receiving, by a synchronization controller of a media device, a first set of HDR media metadata provided in connection with one or more images of media;
   disabling, by the synchronization controller, a metadata synchronization indicator provided to each core of a plurality of processing cores of the media device, responsive to receiving the first set of HDR media metadata;
   writing, by the synchronization controller while the metadata synchronization indicator is disabled, the first set of HDR media metadata to a first memory location; and
   enabling, by the synchronization controller, the metadata synchronization indicator, responsive to completion of writing of the first set of HDR media metadata to the first memory location.

2. The method of claim 1, further comprising:
   transmitting, by the synchronization controller, a synchronization trigger to each core of the plurality of processor cores.

3. The method of claim 2, wherein transmitting the synchronization trigger is performed while the metadata synchronization indicator is disabled; and wherein receipt of the synchronization trigger causes each core of the plurality of processor cores to utilize a previous set of HDR media metadata stored in a second memory location.

4. The method of claim 2, wherein transmitting the synchronization trigger is performed while the metadata synchronization indicator is enabled; and wherein receipt of the synchronization trigger causes each core of the plurality of processor cores to utilize the first set of HDR media metadata stored in the first memory location.

5. The method of claim 1, wherein writing the first set of HDR media metadata to the first memory location further comprises writing, by the synchronization controller while the metadata synchronization indicator is disabled, the first set of HDR media metadata to a buffer of each core of the plurality of processor cores.

6. The method of claim 5, further comprising:
transmitting a synchronization trigger to each core of the plurality of processor cores, by the synchronization controller while the metadata synchronization indicator is disabled, receipt of the synchronization trigger causing each core of the plurality of processor cores to utilize a previous set of HDR media metadata stored in a second buffer of each core of the plurality of cores.

7. The method of claim 5, further comprising:
transmitting a synchronization trigger to each core of the plurality of processor cores, by the synchronization controller while the metadata synchronization indicator is enabled, receipt of the synchronization trigger causing each core of the plurality of processor cores to utilize the first set of HDR media metadata stored in the first buffer.

8. The method of claim 1, wherein writing the first set of HDR media metadata to the first memory location further comprises writing, by the synchronization controller while the metadata synchronization indicator is disabled, the first set of HDR media metadata to memory accessible to the plurality of processor cores at a first address; and
wherein enabling the metadata synchronization indicator further comprises providing the first address to each core of the plurality of processor cores, responsive to completion of writing of the first set of HDR media metadata to the first memory location.

9. The method of claim 8, wherein writing the first set of HDR media metadata to the memory further comprises generating a lookup table comprising the first set of HDR media metadata.

10. A method for synchronization management of high dynamic range (HDR) media metadata, comprising:
receiving, by a first core of a plurality of processing cores of a media device, a synchronization trigger;
determining, by the first core, that a metadata synchronization indicator is enabled;
processing a portion of HDR media according to HDR media metadata stored in a first memory location, by the first core, responsive to the determination that the metadata synchronization indicator is enabled;
subsequently receiving, by the first core, a second synchronization trigger;
determining, by the first core, that the metadata synchronization indicator is disabled; and
processing a prior portion of the HDR media according to the HDR media metadata stored in the first memory location, by the first core, responsive to the determination that the metadata synchronization indicator is disabled.

11. The method of claim 10, further comprising:
subsequently receiving, by the first core, a third synchronization trigger;
determining, by the first core, that the metadata synchronization indicator is enabled; and
processing a subsequent portion of the HDR media according to corresponding subsequent HDR media metadata stored in a second memory location, by the first core, responsive to the determination that the metadata synchronization indicator is enabled.

12. The method of claim 10, further comprising receiving, by the first core from a synchronization controller of the media device, an address of the first memory location storing the HDR media metadata.

13. A system for synchronization management of high dynamic range (HDR) media metadata, comprising:
a media device comprising a plurality of processing cores, a memory unit, and a synchronization controller;
wherein the synchronization controller is configured to:
receive a first set of HDR media metadata provided in connection with one or more images of media,
disable a metadata synchronization indicator provided to each core of the plurality of processing cores, responsive to receiving the first set of HDR media metadata,
write, while the metadata synchronization indicator is disabled, the first set of HDR media metadata to a first memory location of the memory unit, and
enable the metadata synchronization indicator, responsive to completion of writing of the first set of HDR media metadata to the first memory location.

14. The system of claim 13, wherein the synchronization controller is further configured to transmit a synchronization trigger to each core of the plurality of processor cores.

15. The system of claim 14, wherein transmitting the synchronization trigger is performed while the metadata synchronization indicator is disabled; and wherein receipt of the synchronization trigger causes each core of the plurality of processor cores to utilize a previous set of HDR media metadata stored in a second memory location.

16. The system of claim 14, wherein transmitting the synchronization trigger is performed while the metadata synchronization indicator is enabled; and wherein receipt of the synchronization trigger causes each core of the plurality of processor cores to utilize the first set of HDR media metadata stored in the first memory location.

17. The system of claim 13, wherein the synchronization controller is further configured to write, while the metadata synchronization indicator is disabled, the first set of HDR media metadata to a buffer of each core of the plurality of processor cores.

18. The system of claim 17, wherein the synchronization controller is further configured to transmit a synchronization trigger to each core of the plurality of processor cores, while the metadata synchronization indicator is disabled, receipt of the synchronization trigger causing each core of the plurality of processor cores to utilize a previous set of HDR media metadata stored in a second buffer of each core of the plurality of cores.

19. The system of claim 17, wherein the synchronization controller is further configured to transmit a synchronization trigger to each core of the plurality of processor cores, while the metadata synchronization indicator is enabled, receipt of the synchronization trigger causing each core of the plurality of processor cores to utilize the first set of HDR media metadata stored in the first buffer.

20. The system of claim 13, wherein the synchronization controller is further configured to:
   generate a lookup table comprising the first set of HDR media metadata;
   write, while the metadata synchronization indicator is disabled, the lookup table to memory accessible to the plurality of processor cores at a first address; and
   provide the first address to each core of the plurality of processor cores, responsive to completion of writing of the first set of HDR media metadata to the first memory location.

* * * * *